(12) United States Patent
Andersson et al.

(10) Patent No.: US 9,134,866 B2
(45) Date of Patent: Sep. 15, 2015

(54) DRY/WET TOUCH SCREEN (71) Applicant: Sony Corporation, Tokyo (JP)

(72) Inventors: Henric Andersson, Redwood City, CA (US); Werner Johansson, San Mateo, CA (US)

(73) Assignee: Sony Corporation, Tokyo (JP)

( * ) Notice: Subject to any disclaimer, the term of this patent is extended or adjusted under 35 U.S.C. 154(b) by 119 days.

(21) Appl. No.: 13/945,870

(22) Filed: Jul. 18, 2013

(65) Prior Publication Data

US 2015/0022481 A1    Jan. 22, 2015

(51) Int. Cl.
G06F 3/044 (2006.01)
(52) U.S. Cl.
CPC .................................... G06F 3/044 (2013.01)
(58) Field of Classification Search
CPC combination set(s) only.
See application file for complete search history.

(56) References Cited

U.S. PATENT DOCUMENTS

| 2012/0249470 | A1* | 10/2012 | Sugiura et al. | 345/174 |
| 2012/0256867 | A1* | 10/2012 | Annacone | 345/174 |
| 2012/0268411 | A1* | 10/2012 | Chen et al. | 345/174 |
| 2013/0176268 | A1* | 7/2013 | Li et al. | 345/174 |

* cited by examiner

Primary Examiner — Kumar Patel
Assistant Examiner — Amy C Onyekaba
(74) Attorney, Agent, or Firm — James C. Edwards; Moore & Van Allen PLLC (57) ABSTRACT

The invention is directed to systems, methods and computer program products for switching between a dry mode and a wet mode for a mobile device. An exemplary method comprises: determining a first capacitance on a mobile device touchscreen using a sensor associated with the touchscreen, wherein the first capacitance is determined when the touchscreen is submerged under a body of water; comparing the first capacitance to a threshold capacitance; determining whether the first capacitance is greater than or equal to the threshold capacitance; and in response to determining the first capacitance is greater than or equal to the threshold capacitance, switching the touchscreen from a dry mode to a wet mode, wherein in the wet mode, a location associated with a user's touch is determined based on a capacitance at a point on the touchscreen associated with the user's touch being less than the first capacitance.

19 Claims, 5 Drawing Sheets

DRY/WET TOUCH SCREEN

BACKGROUND

A touchscreen functions as an input device and enables a user to interact with a graphical user interface presented on the touchscreen without using a separate input device (e.g., a keypad or keyboard). There are an increasing number of displays (e.g., displays of mobile devices) that function under water; however, there are no displays that enable touchscreen functionality under water. Therefore, there is a need for a touchscreen (or a display which enables touchscreen functionality) both under water (wet condition) and above water (dry condition).

BRIEF SUMMARY

Embodiments of the invention are directed to systems, methods and computer program products for switching between a dry mode and a wet mode. An exemplary method comprises: determining a first capacitance on a mobile device touchscreen using a sensor associated with the touchscreen, wherein the first capacitance is determined when the touchscreen is submerged under a body of water; comparing the first capacitance to a threshold capacitance; determining whether the first capacitance is greater than or equal to the threshold capacitance; and in response to determining the first capacitance is greater than or equal to the threshold capacitance, switching the touchscreen from a dry mode to a wet mode, wherein in the wet mode, a location associated with a user's touch is determined based on a capacitance at a point on the touchscreen associated with the user's touch being less than the first capacitance.

In some embodiments, in the dry mode, a location associated with the user's touch is determined based on a capacitance at a point on the touchscreen associated the user's touch being greater than a base capacitance.

In some embodiments, in the dry mode, the capacitance at the point on the touchscreen associated with the user's touch is less than the first capacitance.

In some embodiments, the first capacitance is determined on the touchscreen when the first capacitance is determined on at least a predetermined number of points on the touchscreen or on at least a predetermined area of the touchscreen.

In some embodiments, the method further comprises executing a function based on determining the location of the user's touch.

In some embodiments, the threshold capacitance is stored in the mobile device.

In some embodiments, the threshold capacitance is associated with the touch of the user's finger.

In some embodiments, the first capacitance comprises a difference in capacitances measured at two different points in time.

In some embodiments, the mobile device comprises at least one of a mobile phone, a tablet computing device, a watch, or an image-capturing device.

In some embodiments, the sensor is either in physical contact with or not in physical contact with the touchscreen.

In some embodiments, the touchscreen comprises a capacitive touchscreen.

In some embodiments, the touchscreen comprises an insulator coated with a transparent conductor.

In some embodiments, the mobile device enables a user to switch between the dry mode and the wet mode.

In some embodiments, an apparatus is provided for switching between a dry mode and a wet mode. The apparatus comprises a touchscreen, a sensor, a memory; a processor; and a module stored in the memory, executable by the processor, and configured to: determine a first capacitance on the touchscreen using the sensor; compare the first capacitance to a threshold capacitance; determine whether the first capacitance is greater than or equal to the threshold capacitance; and in response to determining the first capacitance is greater than or equal to the threshold capacitance, switch the touchscreen from a dry mode to a wet mode when the mobile device is submerged under a body of water, wherein in the wet mode, a location associated with a user's touch is determined based on a capacitance at a point on the touchscreen associated with the user's touch being less than the first capacitance.

In some embodiments, a computer program product is provided for switching between a dry mode and a wet mode. The computer program product comprises a non-transitory computer-readable medium comprising a set of codes for causing a computer to: determine a first capacitance on a mobile device touchscreen using a sensor associated with the touchscreen; compare the first capacitance to a threshold capacitance; determine whether the first capacitance is greater than or equal to the threshold capacitance; and in response to determining the first capacitance is greater than or equal to the threshold capacitance, switch the touchscreen from a dry mode to a wet mode when the mobile device is submerged under a body of water, wherein in the wet mode, a location associated with a user's touch is determined based on a capacitance at a point on the touchscreen associated with the user's touch being less than the first capacitance.

In some embodiments, a method is provided for operating a mobile device touchscreen. The method comprises determining at least one point of first capacitance on the mobile device touchscreen using a sensor associated with the touchscreen, wherein the first capacitance is greater than a threshold capacitance; determining whether the at least one point of first capacitance is not present on the touchscreen; and in response to determining the at least one point of first capacitance is not present on the touchscreen, operating the touchscreen in a dry mode, wherein in the dry mode, a location associated with a user's touch is determined based on a second capacitance at a point on the touchscreen associated with the user's touch being greater than a base capacitance.

In some embodiments, the second capacitance is less than the first capacitance.

In some embodiments, the at least one point comprises a first point and a second point, and wherein the first point and the second point are not adjacent to each other.

In some embodiments, the at least one point comprises multiple points, and the multiple points are determined to be less than a predetermined threshold number of points.

In some embodiments, the at least one point comprises an area, and the area is determined to be less than a predetermined area.

In some embodiments, the mobile device comprises at least one of a mobile phone, a tablet computing device, a watch, or an image-capturing device.

In some embodiments, an apparatus is provided for operating a mobile device touchscreen. The apparatus comprises a touchscreen, a sensor, a memory; a processor; and a module stored in the memory, executable by the processor, and configured to: determine at least one point of first capacitance on the touchscreen using the sensor, wherein the first capacitance is greater than a threshold capacitance; determine whether the at least one point of first capacitance is not present on the touchscreen; and in response to determining the at least one point of first capacitance is not present on the touchscreen, operate the touchscreen in a dry mode, wherein in the dry mode, a location associated with a user's touch is determined based on a second capacitance at a point on the touchscreen associated with the user's touch being greater than a base capacitance.

In some embodiments, a computer program product is provided for operating a mobile device touchscreen. The computer program product comprises a non-transitory computer-readable medium comprising a set of codes for causing a computer to: determine at least one point of first capacitance on the mobile device touchscreen using a sensor associated with the touchscreen, wherein the first capacitance is greater than a threshold capacitance; determine whether the at least one point of first capacitance is not present on the touchscreen; and in response to determining the at least one point of first capacitance is not present on the touchscreen, operate the touchscreen in a dry mode, wherein in the dry mode, a location associated with a user's touch is determined based on a second capacitance at a point on the touchscreen associated with the user's touch being greater than a base capacitance.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for providing a touchscreen that works under wet conditions (e.g., when submerged) and dry conditions. The invention enables a user to interact with a mobile device touchscreen when the mobile device is submerged under water. Therefore, the invention enables a user to capture a photo under water without requiring the mobile device to have a physical key that needs to be pressed in order to capture a photo under water. The present invention requires a change in firmware for a mobile device to switch between the various modes described herein (e.g., a dry mode, a wet mode, etc.).

As described herein, a mobile device touchscreen is a capacitive touchscreen. A capacitive touchscreen comprises an insulator (e.g., glass) coated with a transparent conductor (e.g., indium tin oxide). Since the human body is an electrical conductor, touching the touchscreen results in a distortion of the touchscreen's electrostatic field, which is measurable as a change in capacitance, which, in turn, can be used to determine the location of contact on the touchscreen.

As used herein, a capacitance may refer to a difference in capacitance between two moments in time (e.g., a change in capacitance), or a capacitance measured at a particular moment in time. As used herein, a point of contact with a touchscreen may also refer to an area of contact, or multiple points of contact, wherein the multiple points of contact may or may not be adjacent to each other. As used herein, water may refer to any liquid and is not limited to just water. The present invention is not limited to any particular depth of water for submerging the mobile device. As described herein, any function that is described as being performed by a sensor may be performed by a processor that is in communication with the sensor.

When a mobile device is submerged under water, the mobile device touchscreen is rendered non-functional because a sensor associated with the touchscreen is overwhelmed by the change in capacitance. Essentially, when the mobile device is submerged under water, the touchscreen believes that the user has placed a huge finger on the touchscreen which covers the touchscreen uniformly, thereby hindering touch detection. When the mobile device is submerged, the capacitance of the touchscreen is much greater than the capacitance of the touchscreen when a user's finger touches the touchscreen. The capacitance of a touchscreen that is submerged may be referred to as a high capacitance condition.

The present invention enables a touchscreen to switch from a dry mode to a wet mode (an inverted mode) when the capacitance determined by a sensor associated with touchscreen is equal to or greater than a predetermined capacitance and/or when the high capacitance level is determined uniformly across the entire surface (or at least a predetermined number of points across the surface, at least a predetermined percentage of area across the surface, etc.). The predetermined capacitance (e.g., associated with the touch of a user's finger) along with various other predetermined or threshold values described herein may be stored in the mobile device. The sensor associated with the touchscreen may be located under, above, or at the same vertical level as the touchscreen. In some embodiments, the sensor is in physical contact with the touchscreen, while in other embodiments, the sensor is not in physical contact with the touchscreen.

Once the mobile device switches into the wet mode, when a user touches the touchscreen using the user's finger, the capacitance at the point of contact is lower than the capacitance of the touchscreen which triggered the mobile device to switch from the dry mode to a wet mode. Additionally or alternatively, the capacitance at the point of contact is lower than the capacitance associated with other points on the touchscreen (e.g., the points on the touchscreen that are in contact with water). A sensor associated with the touchscreen determines the point of contact (or location of contact) based on the capacitance at the point of contact being lower than the capacitance which triggered the mobile device to switch from the dry mode to a wet mode, or the capacitance associated with other points on the touchscreen which are in contact with water.

When the device is removed from the body of water under which it was submerged, there may still be water drops on the screen. The sensor associated with the touchscreen determines that the capacitance associated with some points on the touchscreen (points on which water drops are situated) is higher than the capacitance associated with other points (points on which water drops are not situated) on the touchscreen. Additionally or alternatively, the sensor determines that the capacitance associated with the points on the touchscreen where water drops are still situated is similar to the capacitance associated with the touchscreen when the touchscreen was submerged under water. Additionally or alternatively, the sensor determines that the capacitance associated with the points on the touchscreen where water drops are still situated is higher than the capacitance determined at other points of the touchscreen that are in contact with the user's finger (and/or is higher than the capacitance normally associated with the touch of the user's finger even if the user's finger is not in contact with the touchscreen). Additionally or alternatively, the sensor determines that the number of high-capacitance points on the touchscreen is less than or equal to a predetermined number. Additionally or alternatively, the sensor determines that an area covered by the high-capacitance points on the touchscreen is less than or equal to a predetermined area. Additionally or alternatively, the sensor determines that the high-capacitance points on the touchscreen are disjointed and not adjacent to each other. Additionally or alternatively, the sensor determines that the high-capacitance points on the touchscreen are not spread uniformly across the touchscreen. When the sensor makes one or more of these determinations, the mobile device switches back from the wet mode to the dry mode.

In some embodiments, the mobile device described herein enables a user to switch from a dry mode to a wet mode. For example, prior to submerging the mobile device, a user may select an option (via the touchscreen) in dry mode to switch from dry mode to wet mode. Alternatively, a physical button may be provided on the mobile device to switch from dry mode to wet mode and vice versa.

Figure 1:
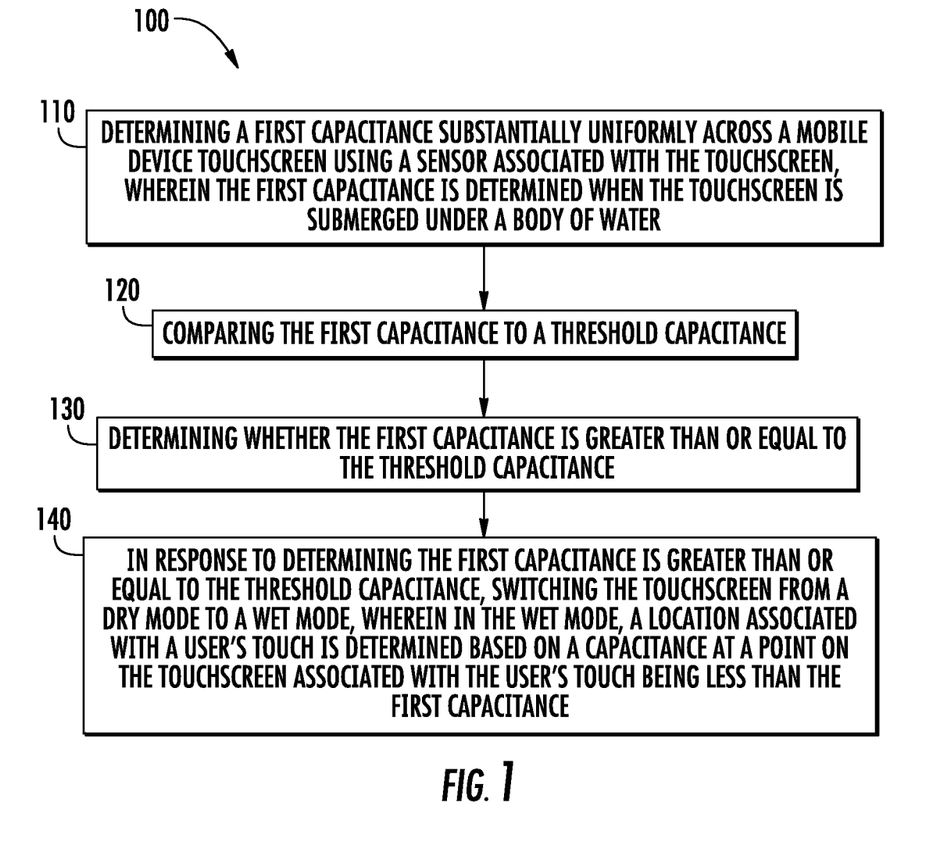
FIG. 1 is an exemplary process flow for switching between a dry mode and a wet mode, in accordance with embodiments of the present invention.

Referring now to FIG. 1, FIG. 1 presents a process flow 100 for switching between a dry mode and a wet mode. The various process blocks presented in FIG. 1 may be executed in an order that is different from that presented in FIG. 1. At block 110, the process flow comprises determining a first capacitance on a mobile device touchscreen using a sensor associated with the touchscreen, wherein the first capacitance is determined when the touchscreen is submerged under a body of water. At block 120, the process flow comprises comparing the first capacitance to a threshold capacitance. At block 130, the process flow comprises determining whether the first capacitance is greater than or equal to the threshold capacitance. At block 140, the process flow comprises in response to determining the first capacitance is greater than or equal to the threshold capacitance, switching the touchscreen from a dry mode to a wet mode, wherein in the wet mode, a location associated with a user's touch is determined based on a capacitance at a point on the touchscreen associated with the user's touch being less than the first capacitance. In some embodiments, the first capacitance is determined on the touchscreen when the first capacitance is determined substantially uniformly across the touchscreen.

Figure 2:
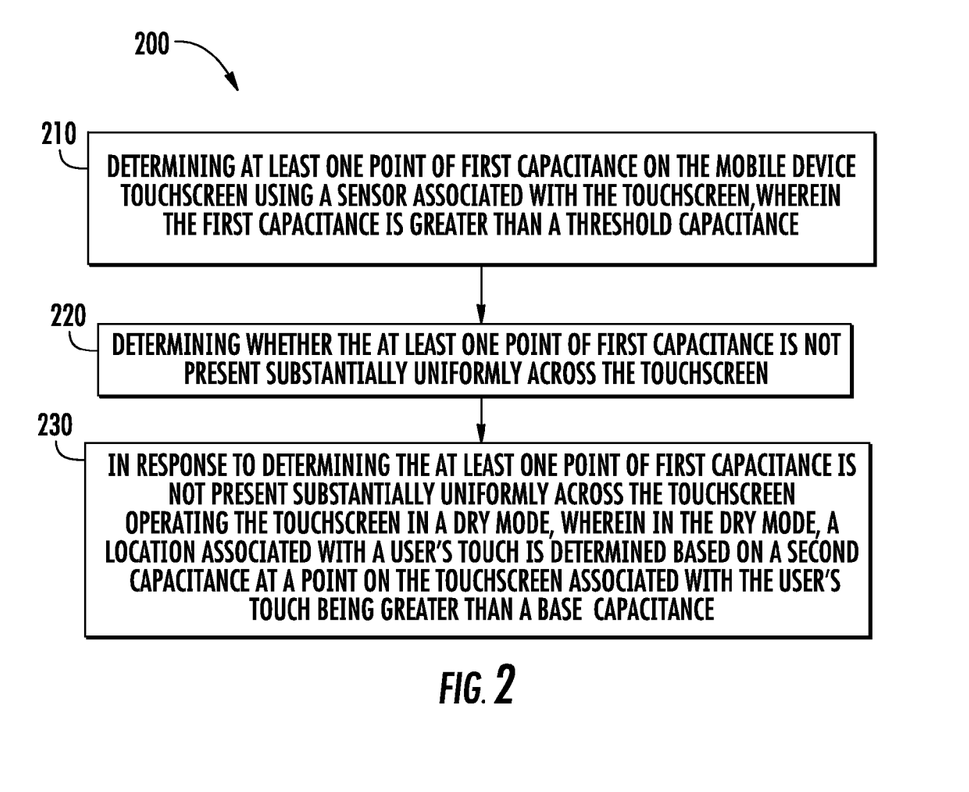
FIG. 2 is another exemplary process flow for switching between a dry mode and a wet mode, in accordance with embodiments of the present invention.

Referring now to FIG. 2, FIG. 2 presents a process flow 200 for operating a mobile device. The various process blocks presented in FIG. 2 may be executed in an order that is different from that presented in FIG. 2. At block 210, the process flow comprises determining at least one point of first capacitance on the mobile device touchscreen using a sensor associated with the touchscreen, wherein the first capacitance is greater than a threshold capacitance. At block 220, the process flow comprises determining whether the at least one point of first capacitance is not present on the touchscreen. At block 230, the process flow comprises in response to determining the at least one point of first capacitance is not present on the touchscreen, operating the mobile device in a dry mode, wherein in the dry mode, a location associated with a user's touch is determined based on a second capacitance at a point on the touchscreen associated with the user's touch being greater than a base capacitance. As used herein, a base capacitance may be a zero or non-zero capacitance (e.g., when the touchscreen is in contact with the air).

Figure 3:
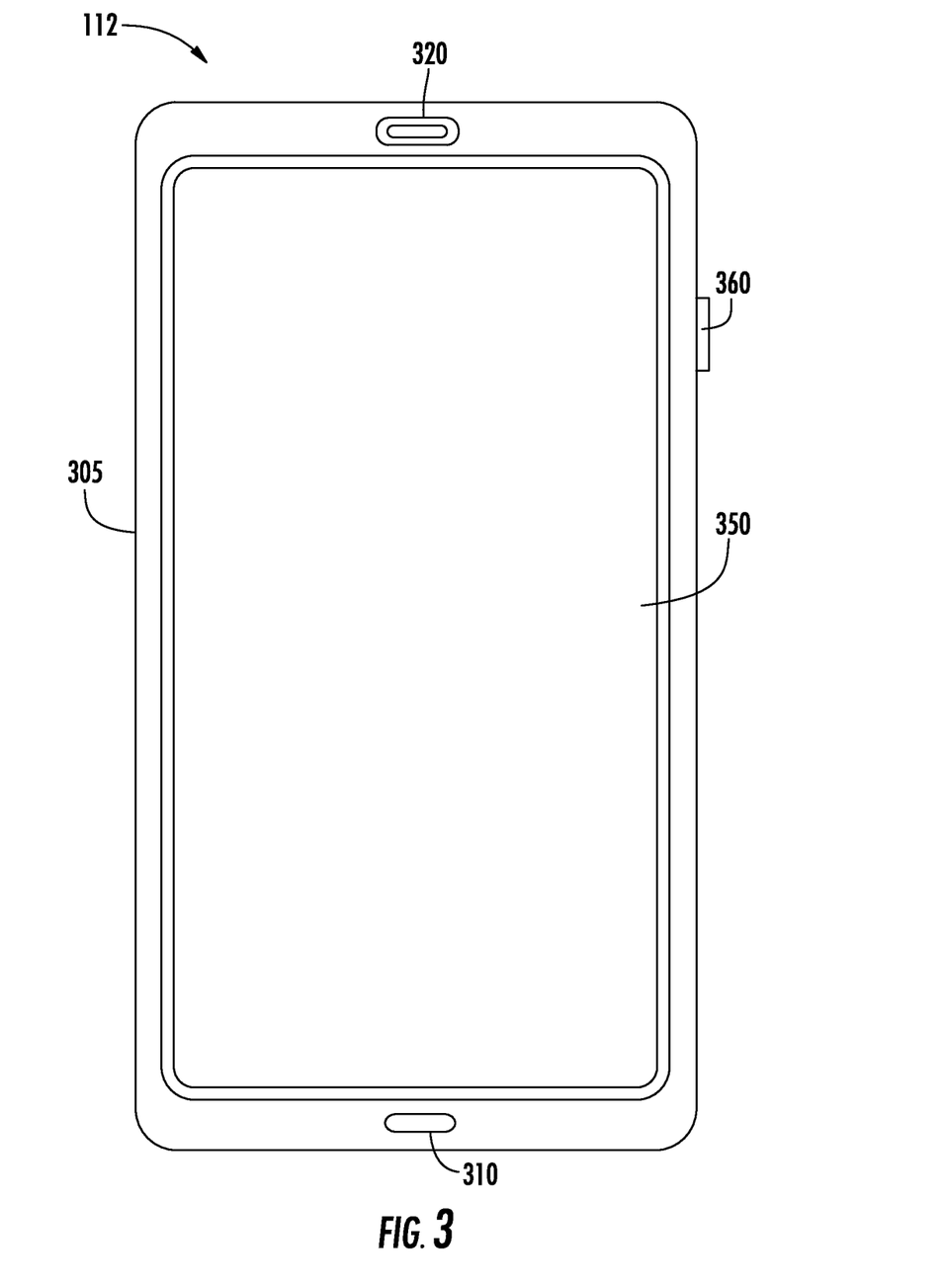
FIG. 3 is an exemplary mobile device, in accordance with embodiments of the present invention.

Referring now to FIG. 3, FIG. 3 is a diagram illustrating a front view of external components of an exemplary mobile device. The mobile device illustrated in FIG. 3 is a mobile communication device (e.g., portable mobile communication device such as a mobile phone). In alternate embodiments, the mobile device may be any other computing device such as a tablet computing device, a laptop computer, a watch, or the like. The mobile device may perform any of the computing functions described herein.

Housing 305 may include a structure configured to contain or at least partially contain components of mobile device 112. For example, housing 305 may be formed from plastic, metal or other natural or synthetic materials or combination(s) of materials and may be configured to support microphone 310, speaker 320, display 350, and camera button 360.

Microphone 310 may include any component capable of transducing air pressure waves to a corresponding electrical signal. For example, a user may speak into microphone 310 during a telephone call. Speaker 320 may include any component capable of transducing an electrical signal to a corresponding sound wave. For example, a user may listen to music through speaker 320.

The display 350 may function as a touchpad or touchscreen. Touchpad may include any component capable of providing input to device 112. Touchpad may include a standard telephone keypad or a QWERTY keypad. Touchpad may also include one or more special purpose keys. A user may utilize touchpad for entering information, such as text or a phone number, or activating a special function, such as placing a telephone call, playing various media, capturing a photo, setting various camera features (e.g., focus, zoom, etc.) or accessing an application.

Display 350 may include any component capable of providing visual information. For example, in one implementation, display 350 may be a liquid crystal display (LCD). In another implementation, display 350 may be any one of other display technologies, such as a plasma display panel (PDP), a field emission display (FED), a thin film transistor (TFT) display, etc. Display 350 may be utilized to display, for example, text, image, and/or video information. Display 350 may also operate as a view finder, as will be described later. A camera button 360 may also be provided that enables a user to take an image. However, in alternate embodiments, the camera button 360 may not be provided.

Since mobile device 112 illustrated in FIG. 3 is exemplary in nature, mobile device 112 is intended to be broadly interpreted to include any type of electronic device that includes an image-capturing component. For example, mobile device 112 may include a mobile phone, a personal digital assistant (PDA), a portable computer, a camera, or a watch. In other instances, mobile device 112 may include, for example, security devices or military devices. Accordingly, although FIG. 3 illustrates exemplary external components of mobile device 112, in other implementations, mobile device 112 may contain fewer, different, or additional external components than the external components depicted in FIG. 3. Additionally, or alternatively, one or more external components of mobile device 112 may include the capabilities of one or more other external components of mobile device 112. For example, display 350 may be an input component (e.g., a touchscreen such as a capacitive touchscreen). The touchscreen may function as a keypad or a touchpad. Additionally or alternatively, the external components may be arranged differently than the external components depicted in FIG. 3.

Figure 4:
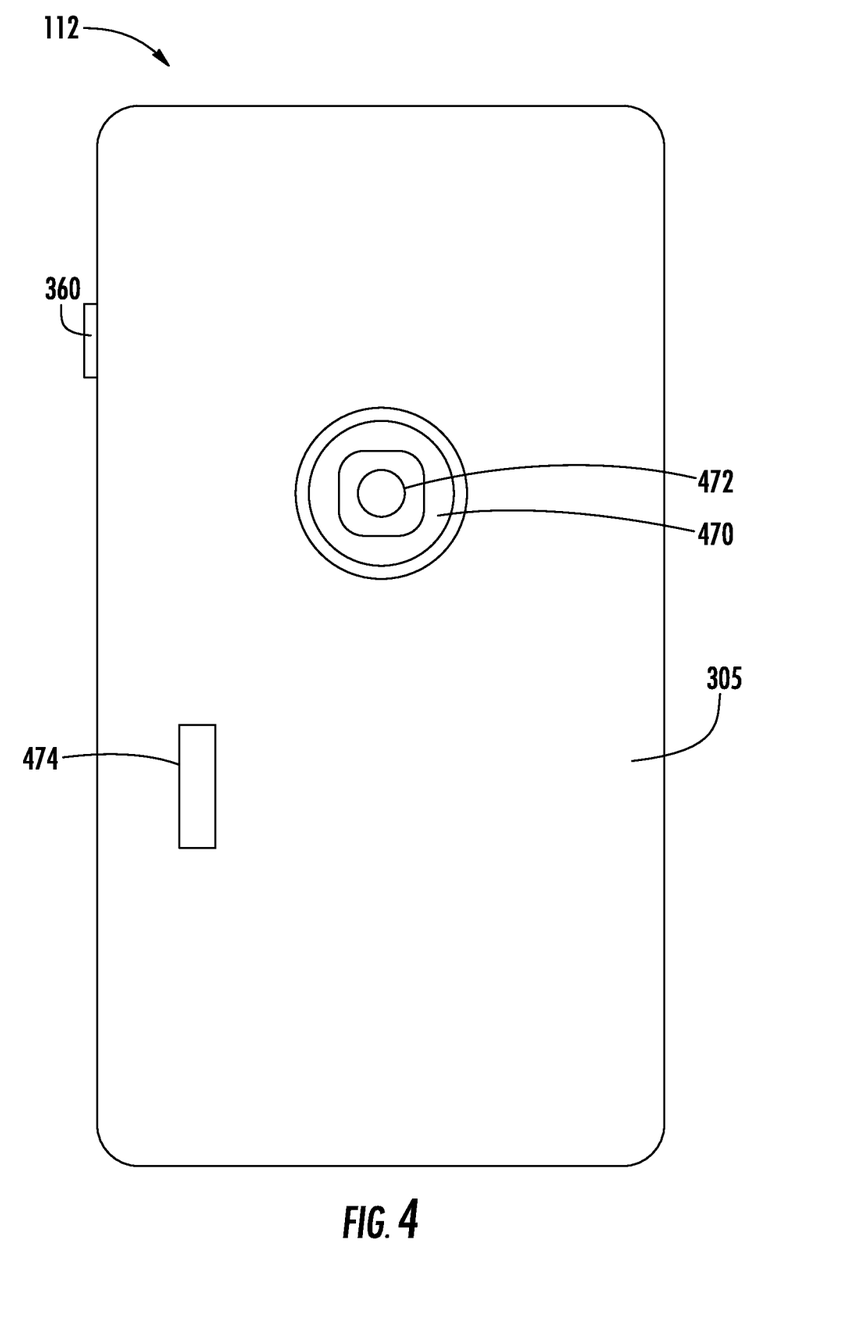
FIG. 4 is a diagram illustrating a rear view of exemplary external components of the mobile device depicted in FIG. 3, in accordance with embodiments of the present invention.

Referring now to FIG. 4, FIG. 4 is a diagram illustrating a rear view of external components of the exemplary mobile device. As illustrated, in addition to the components previously described, mobile device 112 may include a camera 470, a lens assembly 472, a proximity sensor 476, and a flash 474.

Camera 470 may include any component capable of capturing an image. Camera 470 may be a digital camera. Display 350 may operate as a view finder when a user of mobile device 112 operates camera 470. Camera 470 may provide for adjustment of a camera setting. In one implementation, mobile device 112 may include camera software that is displayable on display 350 to allow a user to adjust a camera setting.

Lens assembly 472 may include any component capable of manipulating light so that an image may be captured. Lens assembly 472 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. The optical lens may be multicoated (e.g., an antireflection coating or an ultraviolet (UV) coating) to minimize unwanted effects, such as lens flare and inaccurate color. In one implementation, lens assembly 472 may be permanently fixed to camera 470. In other implementations, lens assembly 472 may be interchangeable with other lenses having different optical characteristics. Lens assembly 472 may provide for a variable aperture size (e.g., adjustable f-number).

Proximity sensor 476 (not shown in FIG. 4) may include any component capable of collecting and providing distance information that may be used to enable camera 470 to capture an image properly. For example, proximity sensor 476 may include a proximity sensor that allows camera 470 to compute the distance to an object. In another implementation, proximity sensor 476 may include an acoustic proximity sensor. The acoustic proximity sensor may include a timing circuit to measure echo return of ultrasonic soundwaves. In embodiments that include a proximity sensor 476, the proximity sensor may be used to determine a distance to one or more moving objects, which may or may not be in focus, either prior to, during, or after capturing of an image frame of a scene. In some embodiments, proximity of an object to the mobile device may be calculated during a post-processing step (e.g., after capturing the image).

Flash 474 may include any type of light-emitting component to provide illumination when camera 470 captures an image. For example, flash 474 may be a light-emitting diode (LED) flash (e.g., white LED) or a xenon flash. In another implementation, flash 474 may include a flash module.

Although FIG. 4 illustrates exemplary external components, in other implementations, mobile device 112 may include fewer, additional, and/or different components than the exemplary external components depicted in FIG. 4. For example, in other implementations, camera 470 may be a film camera. Additionally, or alternatively, depending on mobile device 112, flash 474 may be a portable flashgun. Additionally, or alternatively, mobile device 112 may be a single-lens reflex camera. In still other implementations, one or more external components of mobile device 112 may be arranged differently.

Figure 5:
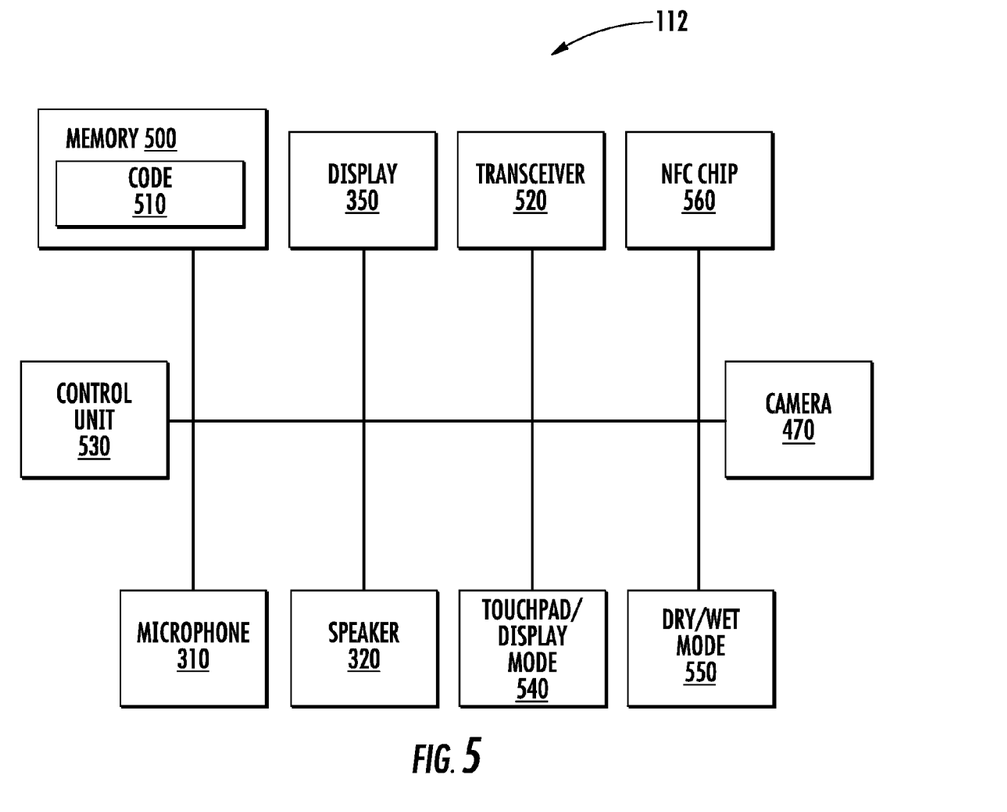
FIG. 5 is a diagram illustrating exemplary internal components of the mobile device depicted in FIG. 3, in accordance with embodiments of the present invention.

Referring now to FIG. 5, FIG. 5 is a diagram illustrating internal components of the exemplary mobile device. As illustrated, mobile device 112 may include microphone 310, speaker 320, display 350, camera 470, a memory 500, a transceiver 520, and a control unit 530. Additionally, the control unit 530 may enable a user to switch between touchpad or display mode 540. In touchpad mode, the display 350 functions as at least one of an input device (e.g., a numeric keypad or a QWERTY touchpad) or an output device. In display mode, the display 350 functions as an output device. Additionally, the control unit 530 enables switching between the dry and wet mode 550 as described herein.

The near-field communication (NFC) Chip 360 comprises an active or passive chip that enables data to be transmitted from the mobile device 112 to a receiving terminal (or received at the mobile device 112 from a sending terminal). An active chip is activated using a power source located in the mobile device 112. A passive chip is activated using an electromagnetic field of the receiving terminal.

Memory 500 may include any type of storing component to store data and instructions related to the operation and use of mobile device 112. For example, memory 500 may include a memory component, such as a random access memory (RAM), a read only memory (ROM), and/or a programmable read only memory (PROM). Additionally, memory 500 may include a storage component, such as a magnetic storage component (e.g., a hard drive) or other type of computer-readable or computer-executable medium. Memory 500 may also include an external storing component, such as a Universal Serial Bus (USB) memory stick, a digital camera memory card, and/or a Subscriber Identity Module (SIM) card.

Memory 500 may include a code component 510 that includes computer-readable or computer-executable instructions to perform one or more functions. These functions include initiating and/or executing the processes described herein. The code component 510 may work in conjunction with one or more other hardware or software components associated with the mobile device 112 to initiate and/or execute the processes described herein. Additionally, code component 510 may include computer-readable or computer-executable instructions to provide other functionality other than as described herein.

Transceiver 520 may include any component capable of transmitting and receiving information wirelessly or via a wired connection. For example, transceiver 520 may include a radio circuit that provides wireless communication with a network or another device.

Control unit 530 may include any logic that may interpret and execute instructions, and may control the overall operation of mobile device 112. Logic, as used herein, may include hardware, software, and/or a combination of hardware and software. Control unit 530 may include, for example, a general-purpose processor, a microprocessor, a data processor, a co-processor, and/or a network processor. Control unit 530 may access instructions from memory 500, from other components of mobile device 112, and/or from a source external to mobile device 112 (e.g., a network or another device).

Control unit 530 may provide for different operational modes associated with mobile device 112. Additionally, control unit 530 may operate in multiple modes simultaneously. For example, control unit 530 may operate in a camera mode, a music player mode, and/or a telephone mode. For example, when in camera mode, face-detection and tracking logic may enable mobile device 112 to detect and track multiple objects (e.g., the presence and position of each object's face) within an image to be captured.

Although FIG. 5 illustrates exemplary internal components, in other implementations, mobile device 112 may include fewer, additional, and/or different components than the exemplary internal components depicted in FIG. 5. For example, in one implementation, mobile device 112 may not include transceiver 520. In still other implementations, one or more internal components of mobile device 112 may include the capabilities of one or more other components of mobile device 112. For example, transceiver 520 and/or control unit 530 may include their own on-board memory.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for switching between a dry mode and a wet mode for a mobile device touchscreen, the method comprising:
   determining a first capacitance on a mobile device touchscreen using a sensor associated with the touchscreen, wherein the first capacitance is determined when (a) the touchscreen is submerged under a body of water, and (b) capacitance is substantially uniform across (i) a predetermined plurality of non-adjacent points of contact across a surface of the touchscreen, or (ii) a predetermined area of the surface of the touchscreen, wherein the predetermined area comprises a plurality of points of contact;
   comparing the first capacitance to a threshold capacitance;
   determining whether the first capacitance is greater than or equal to the threshold capacitance; and
   in response to determining the first capacitance is greater than or equal to the threshold capacitance, switching the touchscreen from a dry mode to a wet mode, wherein in the wet mode, a location associated with a user's touch is determined based on a capacitance at a point on the touchscreen associated with the user's touch being less than the first capacitance.

2. The method of claim 1, wherein in the dry mode, a location associated with the user's touch is determined based on a capacitance at a point on the touchscreen associated the user's touch being greater than a base capacitance.

3. The method of claim 2, wherein in the dry mode, the capacitance at the point on the touchscreen associated with the user's touch is less than the first capacitance.

4. The method of claim 1 wherein the first capacitance is determined on the touchscreen when the capacitance is substantially uniform across an entirety of the surface of the touchscreen.

5. The method of claim 1, further comprising executing a function based on determining the location associated with the user's touch.

6. The method of claim 1, wherein the threshold capacitance is stored in the mobile device.

7. The method of claim 1, wherein the threshold capacitance is associated with the touch of the user's finger.

8. The method of claim 1, wherein the first capacitance comprises a difference in capacitances measured at two different points in time.

9. The method of claim 1, wherein the sensor is either in physical contact with or not in physical contact with the touchscreen.

10. The method of claim 1, wherein the touchscreen comprises a capacitive touchscreen or an insulator coated with a transparent conductor.

11. The method of claim 1, wherein the mobile device enables the user to switch between the dry mode and the wet mode.

12. A mobile apparatus for switching between a dry mode and a wet mode, the apparatus comprising:
   a touchscreen;
   a sensor;
   a memory;
   a processor; and
   a module stored in the memory, executable by the processor, and configured to:
   determine a first capacitance on the touchscreen using the sensor, wherein the first capacitance is determined when (a) the touchscreen is submerged under a body of water, and (b) capacitance is substantially uniform across (i) a predetermined plurality of non-adjacent points of contact across a surface of the touchscreen, or (ii) a predetermined area of the surface of the touchscreen, wherein the predetermined area comprises a plurality of points of contact;
   compare the first capacitance to a threshold capacitance;
   determine whether the first capacitance is greater than or equal to the threshold capacitance; and
   in response to determining the first capacitance is greater than or equal to the threshold capacitance, switch the touchscreen from a dry mode to a wet mode, wherein in the wet mode, a location associated with a user's touch is determined based on a capacitance at a point on the touchscreen associated with the user's touch being less than the first capacitance.

13. The mobile apparatus of claim 12, wherein the first capacitance is determined on the touchscreen when the capacitance is substantially uniformly across an entirety of the surface of the touchscreen.

14. A method for switching a mobile device touchscreen from a wet mode to a dry mode, the method comprising:
   in response to removing the mobile device touchscreen, operating in the wet mode, from submersion in a body of water, determining at least one point of first capacitance on the mobile device touchscreen using a sensor associated with the touchscreen, wherein the first capacitance is greater than a threshold capacitance;
   determining whether the at least one point of first capacitance is not present on the touchscreen; and
   in response to determining the at least one point of first capacitance is not present on the touchscreen, switching the touchscreen from the wet mode to the dry mode, wherein in the dry mode, a location associated with a user's touch is determined based on a second capacitance at a point on the touchscreen associated with the user's touch being greater than a base capacitance.

15. The method of claim 14, wherein the second capacitance is less than the first capacitance.

16. The method of claim 14, wherein the at least one point comprises a first point and a second point, and wherein the first point and the second point are not adjacent to each other.

17. The method of claim 14, wherein the at least one point comprises multiple points, and wherein the multiple points are determined to be less than a predetermined threshold number of points.

18. The method of claim 14, wherein the at least one point comprises an area, and wherein the area is determined to be less than a predetermined area.

19. The method of claim 14, wherein the first capacitance is determined on the touchscreen when the capacitance is substantially uniform across an entirety of the surface of the touchscreen.

* * * * *